(12) United States Patent
Mattern

(10) Patent No.: US 7,269,537 B1
(45) Date of Patent: Sep. 11, 2007

(54) INFRASOUND SENSOR WITH DISTURBANCE FILTERING

(76) Inventor: Duane Loren Mattern, 31 E. 45th St., Indianapolis, IN (US) 46205

( * ) Notice: Subject to any disclaimer, the term of this patent is extended or adjusted under 35 U.S.C. 154(b) by 0 days.

(21) Appl. No.: 11/361,491

(22) Filed: Feb. 25, 2006

Related U.S. Application Data

(60) Provisional application No. 60/656,623, filed on Feb. 26, 2005.

(51) Int. Cl.
*G01V 1/28* (2006.01)

(52) U.S. Cl. .......................... 702/190; 702/14; 702/15; 702/17; 702/18; 356/477; 356/28.5; 285/12; 285/13

(58) Field of Classification Search ................ 702/190, 702/141, 138, 104, 98, 1–4, 14–18, 189, 702/191; 356/477, 28.5, 342; 385/12, 13
See application file for complete search history.

(56) References Cited

U.S. PATENT DOCUMENTS

| | | | |
|---|---|---|---|
| 5,943,641 A * | 8/1999 | Carme et al. ................ | 702/191 |
| 6,036,642 A | 3/2000 | Diab et al. | |
| 6,675,036 B2 | 1/2004 | Kreger et al. | |
| RE38,492 E | 4/2004 | Diab et al. | |
| 6,788,417 B1 | 9/2004 | Zumberge et al. | |
| 7,016,785 B2 * | 3/2006 | Makela et al. ................. | 702/4 |

OTHER PUBLICATIONS

Bedard, A.J. Jr., Bartram, B.W., Keane, A.N., Welsh, D.C., Nishiyama R. T., The Infrasound network (ISNet): Background, design details, and display capability as a 88D adjunct tornado detection tool, 22nd Conference on Severe Local Storms, (Hyannis, MA), Oct. 4-8, 2004. http://ams.confex.com/ams/11aram22sls/techprogram/meeting_11aram22sls.htm.

Zumberge M., Berger J., Hedlin M., Husmann, E. Nooner S., Hilt R., Widmer-Schnidrig R., An optical fiber infrasound sensor: A new lower limit on atmospheric pressure noise between 1 and 10 Hz, Journal of Acoustic Society of American, #113 (5), May 2003. http://klops.geophys.uni-stuttgart.de/~widmer/JASAfinal.pdf.

Noble, J.M. and Tenney, S.M. Detection of naturally occuring events from small aperture infrasound arrays, The Battlespace Atmospheric and Cloud Impacts on Military Operations (BACIMO) Conference, Monterey, CA, Sep. 2003. http://www.nrlmry.navy.mil/BACIMO/2003/abstracts/7-13%20Noble.doc.

(Continued)

*Primary Examiner*—John Barlow
*Assistant Examiner*—Hien Vo
(74) *Attorney, Agent, or Firm*—Baker & Daniels LLP

(57) ABSTRACT

The invention pertains to the sensing and measurement of infrasound (pressure variations with frequency content under 10 Hertz). The invention measures the infrasound pressure variations and then attenuates undesired contributions due to, but not limited to, changes in ambient fluid speed and changes in altitude of the sensing device. The undesired contributions are attenuated using an adaptive filter with the measurements of the change in ambient fluid speed and the change in altitude. This approach differs from existing applications of adaptive filtering in that the invention uses measurements of speed and displacement to improve a pressure measurement. This approach differs from existing methods for attenuating the affects of the wind on the measurement of infrasound in that it does not require the use of a large spatial averaging filter.

20 Claims, 4 Drawing Sheets

OTHER PUBLICATIONS

Stubbs C., et al., Tactical Infrasound, The MITRE Corporation, JASON Program Office, unclassified report sponsored by the United States Army Intelligence and Security Command, May, 2005, http://www.fas.org/irp/agency/dod/jason/infrasound.pdf.

Smith, S. W., The Scientist and Engineer's Guide to Digital Signal Processing, 1999, chp. 15. http://www.dspguide.com.

Kalman Adaptive Filter, Matlab Signal Processing Toolbox, Mathworks, Inc, Natick, MA. http://www.mathworks.com/access/helpdesk/help/toolbox/dspblks/kalmanadaptivefilter.html.

Masimo SET™ Pulse Oximeter, Masimo Corporation, Irvine, CA USA. http://www.masimo.com/whymasimo.difference.htm.

Purdon P.L., Jaaskelainen I.P., Solo V., Brown E.N., Belliveau J.W., Bonmassar G., "Ballistocardiogram Removal and Motion Correction for EEG in the Magnet", Proc. Intl. Soc. Mag. Reson. Med 9 (2001). http://cds.ismrm.org/ismrm-2001/PDF1/0029.pdf.

The inframatics organization provides information about the use of sub audible sound waves in the atmosphere for studying natural atmospheric phenomena and monitoring antropogenic sound sources including clandestine nuclear tests. The main product of this organization's website is a quarterly newsletter that includes articles summarizing ground breaking research in low-frequency atmospheric acoustics. http://www.inframatics.org/pdf/inframatics_jun2006_lo.pdf.

Hedlin, M., Raspet, R., Infrasonic wind-noise reduction by barriers and spatial filters, The Journal of the Acoustical Society of America—Sep. 2003—vol. 114, Issue 3, p. 1379, abstract only used.

Zuckerwar A.J., Shams Q.A., Ahuja K.K, Funk R., Soaker hose versus compact nonporous windscreen: A comparison of performance at infrasonic frequencies, The Journal of the Acoustical Society of America—Sep. 2005—vol. 118, Issue 3, p. 2009, abstract only used.

Alcoverro B., Le Pichon A., Design and optimization of a noise reduction system for infrasonic measurements using elements with low acoustic impedance, The Journal of the Acoustical Society of America—Apr. 2005—vol. 117, Issue 4, p. 1717, abstract only used.

Hedlin M., Alcoverro B., The use of impedance matching capillaries for reducing resonance in rosette infrasonic spatial filters, The Journal of the Acoustical Society of America—Apr. 2005—vol. 117, Issue 4, p. 1880, abstract only used.

Malan D., MoraaL H., The effect of wind on pressure correction of the SANAE neutron monitor counting rate, Antarctic Research, South African Journal of Science 98, Month 2002, p. 1.

Monroe R., The Deep End of Sound, Scripps Institution of Oceangraphy, vol. 9, No. 2, Fall 2002 p. 12. http://explorations.ucsd.edu/back/exp_pdfs/Volume_9_n2/The_Deep_End_Of_Sound_V9n2.pdf.

Mutschlecner J.P., Whitaker R.W., The Design and Operation of Infrasonic Microphones, Los Alamos National Laboratory, LA-13257, UC-706, Issued: May 1997. http://geology.heroy.smu.edu/~hayward/Projects/Infrasonics/resources/Papers/lapubs00326384.pdf.

Chaparral Physics, A Division of the Geophysical Institute of the University of Alaska http://www.chaparral.gi.alaska.edu/.

Evers L.G., Haak H.W., The Deelen Infrasound Array: on the detection and identification of infrasound, Royal Netherlands Meteorological Institute, Seismology Division, KNMI TR-225, Aug. 2000, ISBN: 90-369-2175-9. http://www.knmi.nl/~evers/reports/KNMItr225.pdf.

Kromer R.P., McDonald T.S., Report on the Test and Evaluation of the Chaparral Physics Model 4.1.1 Prototype Microbarograph for CTBT Infrasound Array Application, Sandia National Laboratories, SAND98-0127, Jan. 1998.

Seattle P1 Infrasound Microphone, Project Summary Datasheet, Southern Methodist University, Geology Department.

Hedlin, M.A.H., Berger J., Experiements with Infrasonic Noise-Reducing Spatial Filters, "24th Seismic Research Review".

Evers, L., Infrasound Monitoring in the Neitherlands, Nederlands akoestisch genootschap journaal, nr. 176, Sep. 2005.

* cited by examiner

Array Geometry

US 7,269,537 B1

INFRASOUND SENSOR WITH DISTURBANCE FILTERING

CROSS-REFERENCE TO RELATED APPLICATIONS

This application claims the benefit of Provisional Patent Application No. U.S. 60/656,623, filed 2005 Feb. 26, by the present inventor.

FEDERALLY SPONSORED RESEARCH

Not Applicable.

SEQUENCE LISTING OR PROGRAM

Not Applicable.

BACKGROUND OF THE INVENTION

1. Field of Endeavor

The invention pertains to the sensing of, and sensors for the detection of, infrasound (pressure variations with frequency content under 10 Hertz). The present invention concerns a method for removing the effects of undesirable disturbances from the measurement of infrasound. The discussion that follows focuses on air, but the invention is not limited to air as the medium for transmission of infrasound.

2. Infrasound Prior Art

Infrasound is typically classified as low frequency (under 10 Hertz) pressure waves with long wavelengths (greater than 30 meters in air). These signals are outside the hearing range of humans. These signals have been detected with a variety of devices, including highly sensitive barometers, differential pressure sensors, and fiber optic interferometers. The typical purpose for measuring infrasound is to detect the source of generation of the infrasound. Sources of infrasound range from man-made, such as bridge vibration, nuclear explosions (Comprehensive Test Ban Treaty) and industrial processes, to naturally occurring events, such as: volcanoes, meteorite impact, tidal action, tornadoes, tsunamis, avalanches, earthquakes, ground swell prior to earthquakes, . . . etc. The pressure variations that cause infrasound are small relative to the ambient pressure, thus the detectors must be very sensitive. This sensitivity allows the detector to pick-up pressure changes that are not caused by the source of interest, in particular wind. Much of the current research in infrasound sensing is on techniques for eliminating the wind disturbance from the pressure measurement.

The primary technique for reducing the winds contribution to infrasound signal is a spatial filter. A spatial filter involves a distributed measurement. Such a measurement is made over a length or area to average-out local pressure variations due to the localized affects of wind. For pneumatic differential pressure sensors a spatial filter typically involves a network of perforated pipes or permeable hoses that feed a single volume that is used as the source of the differential pressure measurement. Bedard et al. (2004) presented the results from the deployment of such a system. The sensor included a spatial filter for reducing wind-induced pressure fluctuations, which was composed of twelve porous hoses arranged in a diameter of about 50 feet, FIG. 1. Zumberge et al. (2003) presents the results of an optical fiber infrasound sensor (OFIS) that measures, interferometrically, pressure-induced strain in a sealed tube. The OFIS system has a length of 89 meters (left, FIG. 2) and is compared to a pneumatic pipe array on the right in FIG. 2.

The OFIS measurement is distributed over a length. The "line receiver", implementation of OFIS has directional sensitivity and has a frequency roll-off for signals sources not at 90 degrees to the line (Zumberge et al., 2003). This directional sensitivity is by design. The OFIS is described in U.S. Pat. No. 6,788,417 B1 (May 2004). U.S. Pat. No. 6,788,417 also summarized the prior art on wind noise in infrasound measurements and includes a discussion of the prior air of noise reduction methods using perforated pipes and permeable hoses. In Noble and Tenney (2003), the U.S. Army documents the use of a sensor array with 20-meter spacing to detect impulsive signals in the frequency range of 3–8 Hz. More recently, Stubbs et al, (2005), "examines ways to enhance the effectiveness of infrasound monitoring", including arranging the filter hoses to increase directional sensitivity. All of the above techniques discuss distributed measurements that achieve wind-borne noise reduction using some type of spatial filtering.

A disadvantage of the above approaches to reducing the contribution of the wind to the measurement of infrasound is that the implementation of spatial filtering is relatively large physically. The array in Noble and Tenney (2003) is 20 meters in diameter and the OFIS in FIG. 2 is 89 meters long. The pneumatic array FIG. 2 is on the order of 50 meters in diameter. The hardware used for the spatial filters is continuous, not discrete components. The measurement is an average over the length of pipe or hose. These implementations of spatial filtering require real estate proportional to the wavelength of interest, necessitating the location of the sensor in areas where land is available. The land must also be maintained and secured, which requires a recurring labor cost.

Another disadvantage of the above approaches is that while in use, these sensors must be stationary. Vertical displacements as a function of time could be perceived as infrasound since atmospheric pressure is correlated with altitude. The distributed sensors with spatial filters assume that the ground, averaged over the sensor length, is fixed and not moving and thus not a contributing factor in the measurement of infrasound. This confines the sensor to a stationary position.

Another disadvantage of the above approaches is that because they are large, and in some cases buried underground, they are not easily relocated. Deployment of these sensors is typically permanent. It may be possible to transport the sensor to another location, but the sensor is not easily moved and reused at another location. This precludes the reuse of these sensors at alternative locations.

Another disadvantage of the above approaches is that the filtering technique is a function of hardware. These implementations of spatial filtering are a result of the distributed and continuous nature of the sensor hardware. Thus, the filtering technique is fixed and cannot be changed. In Bedard et al. (2004) the filter is a function of the geometry of the permeable hoses. In Zumberge et al. (2003) the filter is a function of the orientation and length of the OFIS. Spatial filtering is essentially an averaging filter, averaged over the length of the OFIS or pipe array. As a filtering technique, averaging is only optimal if the time domain properties are to be maintained, as in a sudden or step change as described in Smith, (1999). If it is desired to maintain frequency domain characteristics of the signal, then filtering techniques other than averaging will lead to improved results. If the signal source of interest is periodic (a tornado for example) then frequency separation of the measured signal is desired. An averaging filter cannot separate one band of frequencies from another because the averaging filter has poor stop-band attenuation properties. For periodic signals an averaging filter is not the right filter choice to get the best frequency separation and the above approaches are locked into the use of an averaging filter.

3. Adaptive Filtering Prior Art

Adaptive filters have been incorporated into numerous patents, commercial devices and software. The commercial computer program MATLAB® Signal Processing Toolbox from Mathworks, Inc. (Natick, Mass. USA) contains an implementation of a "Kalman Adaptive Filter". The Masimo SET™ oximeter sensor uses an adaptive filter to remove undesired pulse components from the measure of blood oxygen, (U.S. Pat. No. 6,036,642 and RE38,492E). In Purdon et al (2001), an adaptive filter is used to remove an unwanted signal from an EEG measurement using a head motion sensor. U.S. Pat. No. 6,675,036B2, by Kreger et al (2004) describe a medical imaging devices that uses an adaptive filter to reduce the affects of bio-potential signals caused by a patient's respiration. In U.S. Pat. No. 5,943,641, Carme, et al (1999) describes a device for "recovering a wanted acoustic signal from a composite acoustic signal including interference components". Carme et al claims acoustic signals for both the composite and the reference acoustic signals. All of the above adaptive filters use similar techniques. These adaptive filters all use at least one additional measurement. This additional measure is correlated with some undesired component. This additional measure is filtered, then used to reduce the contributions of the undesired component in the primary measurement of interest. In the above patents, it is the combination of signals used in the measurement that is unique, not the adaptive filter algorithm of which there are many. All of the adaptive filter algorithms work similarly to minimize a cost function, typically a mean squared error, such as the Least Mean Squared (LMS) algorithm.

BRIEF SUMMARY OF THE INVENTION

The present invention takes additional measurements that are correlated with disturbance components and actively attenuates these undesirable contributions to the primary measurement of interest. The present invention measures changes in ambient fluid speed and changes in the sensor altitude and uses these signals to attenuate unwanted signal components in a pressure measurement used to measure infrasound. Adaptive filtering is used to synthesize the correction to be made to the pressure measurement. Adaptive filtering is a known technique. It is the application of adaptive filtering to the measurement of infrasound using speed and displacement as additional measurements that is new and innovative in the present invention.

Infrasound is measured using a suitable sensor, typical, but not limited to, a differential pressure sensor. Wind speed is measured using a sensor with an adequate bandwidth, for example an ultrasonic wind sensor. Vertical displacement is measured using any suitable technique, for example twice integrating the signal from a vertical accelerometer. The change in air speed and the change in the vertical displacement signals are used with an adaptive filter to remove components correlated with each of these measurements from the change in pressure signal. The result is a filtered measure of infrasound.

The present invention makes measurements at a point. The invention does not make a distributed measurement nor does it require a spatial filter to remove the disturbances caused by the wind. Since the distributed measurement and spatial filter are not required, the physical size of the device is much smaller. The size of the invention is a function of the size of the housing to package the three sensors, a differential pressure sensor, an air speed sensor, and a sensor to detect the change in altitude. Because the device is relatively small, it can be installed in a variety of locations. Real estate is not a major considering for the installation.

The present invention removes the contribution caused by changes in altitude from the measurement of infrasound. Therefore, the invention does not need to be fixed to the ground nor does the invention have to assume that the ground is stationary. This allows the invention to be mounted on platforms that move, such as a buoy, a floating platform, or a building.

The present invention does not require a spatial filter and is physically relatively small. Thus, the installation of the invention does not have to be permanent. The present invention is transportable and can be moved from site to site. Since the invention is easily deployed, it can be reused at numerous locations. This reduces the total cost for sites that only need the sensor for a short period of time.

The present invention makes measurements at a point. The present invention is not a distributed measurement and does not use an averaging filter. However, multiple versions of the present invention can be used in a network or sensor web. The advantage of this sensor grid comprised of discrete nodes is that a variety of grid geometries can be selected. The sensor web would require the relative location of each sensor and would need to have a uniform measurement of time for each sensor. This geometry and time information can be obtain at each node in the grid from the Geosynchronous Position System (GPS) signals. Such a sensor web comprised of multiple, discrete point-sensors has the advantage that the spatial filtering technique is not defined by the hardware. Thus, filters other than an averaging filter could be used. A variety of spatial filters could be used. Directional sensitivity would be a matter of software selection instead of hardware installation. Signal processing techniques suitable for the network geometry, signal type and source, and the type of information to be extracted can be selected.

The present invention has the advantage that it allows for a variety of grid geometries in a sensor network. A network of point sensors enables new information to be extracted from the data that was not previously available. For example, wave-front timing and triangulation can be used to estimate direction and distance from the source of the infrasound.

The present invention attenuates the affect of changing wind speed and altitude on the measurement of infrasound. With sufficient attenuation, the invention can be vehicle mounted. When the invention is combined with accurate GPS location and timing signals it is possible for the sensor to account for Doppler effects caused by being in motion.

DETAILED DESCRIPTION OF THE INVENTION

Figure 1:
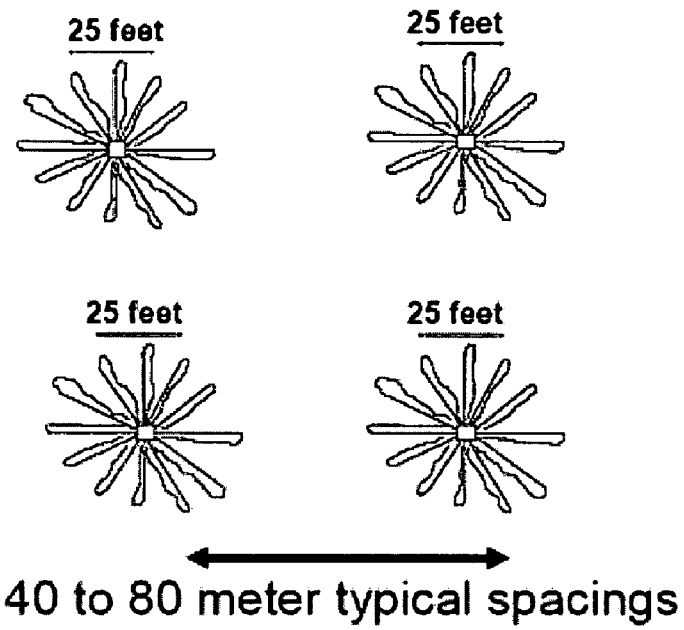
FIG. 1 is prior art showing an array of spatial filters used for reducing wind-induced pressure fluctuations in the infrasonic frequency range from Bedard et al. (2004). This figure demonstrates the physical size of pneumatic infrasound sensors. A typical sensor is composed of twelve radial arms with ports at one-foot intervals with a diameter of fifty feet. A typical array of four such sensors would cover an area of 100 meters by 100 meters.
Figure 2:
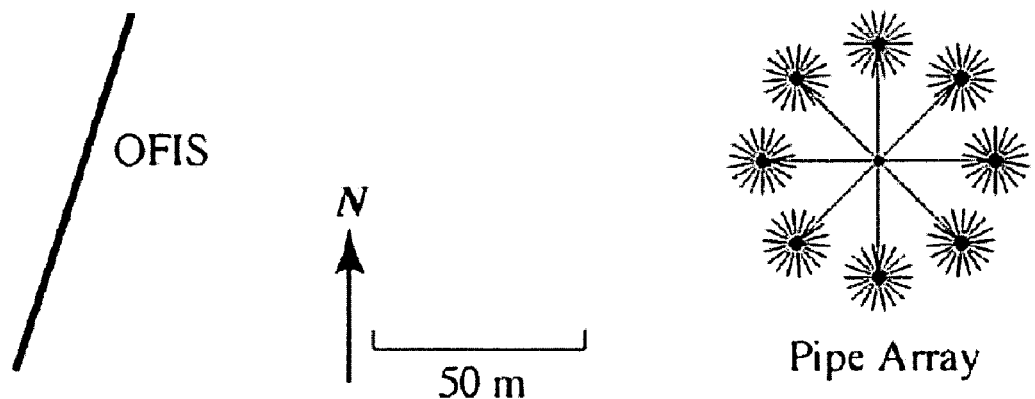
FIG. 2 is prior art that compares the size and geometry of the optical fiber infrasound sensor (OFIS) to an infrasonic pipe array sensor in Zumberge et al (2003). The OFIS is 89 feet in length. The pipe array covers an area of about 80 meters by 80 meters.
Figure 3:
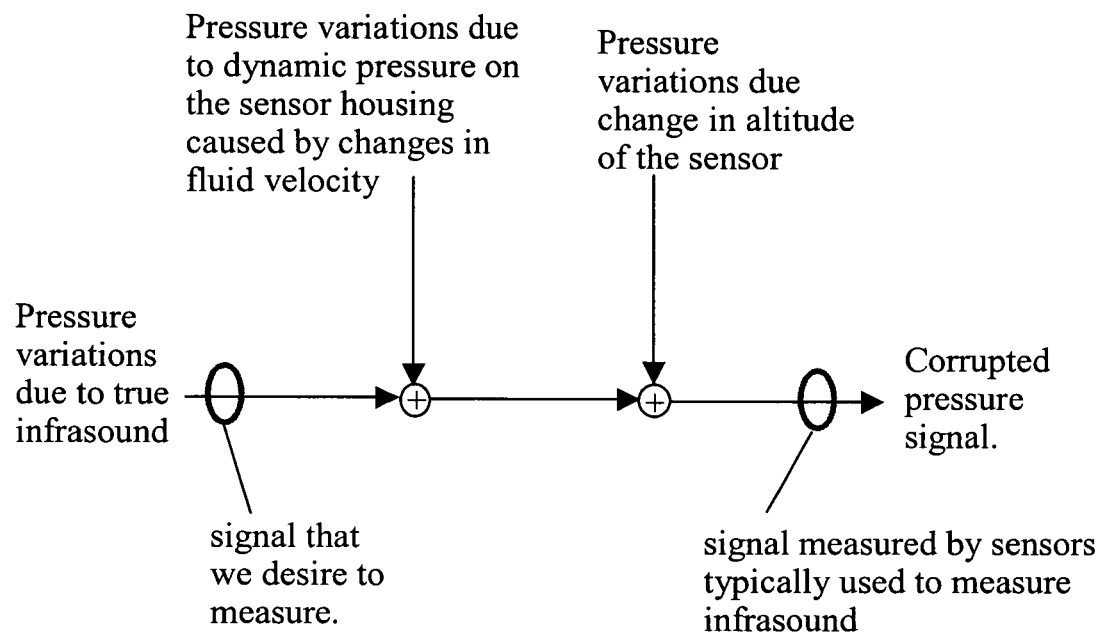
FIG. 3 is a signal model showing how the true infrasound signal is corrupted by the changes in changes in fluid speed and changes in altitude.

The invention views the infrasound pressure measurement as having been corrupted by changes in fluid speed and changes in altitude as shown in FIG. 3. The invention adds the measurement of the change in fluid speed and change in altitude to the infrasound pressure measurement. The invention uses these additional measurements with an adaptive filter to remove those terms from the infrasound pressure measurement that are correlated to the change in fluid speed and changes in altitude.

Figure 4:
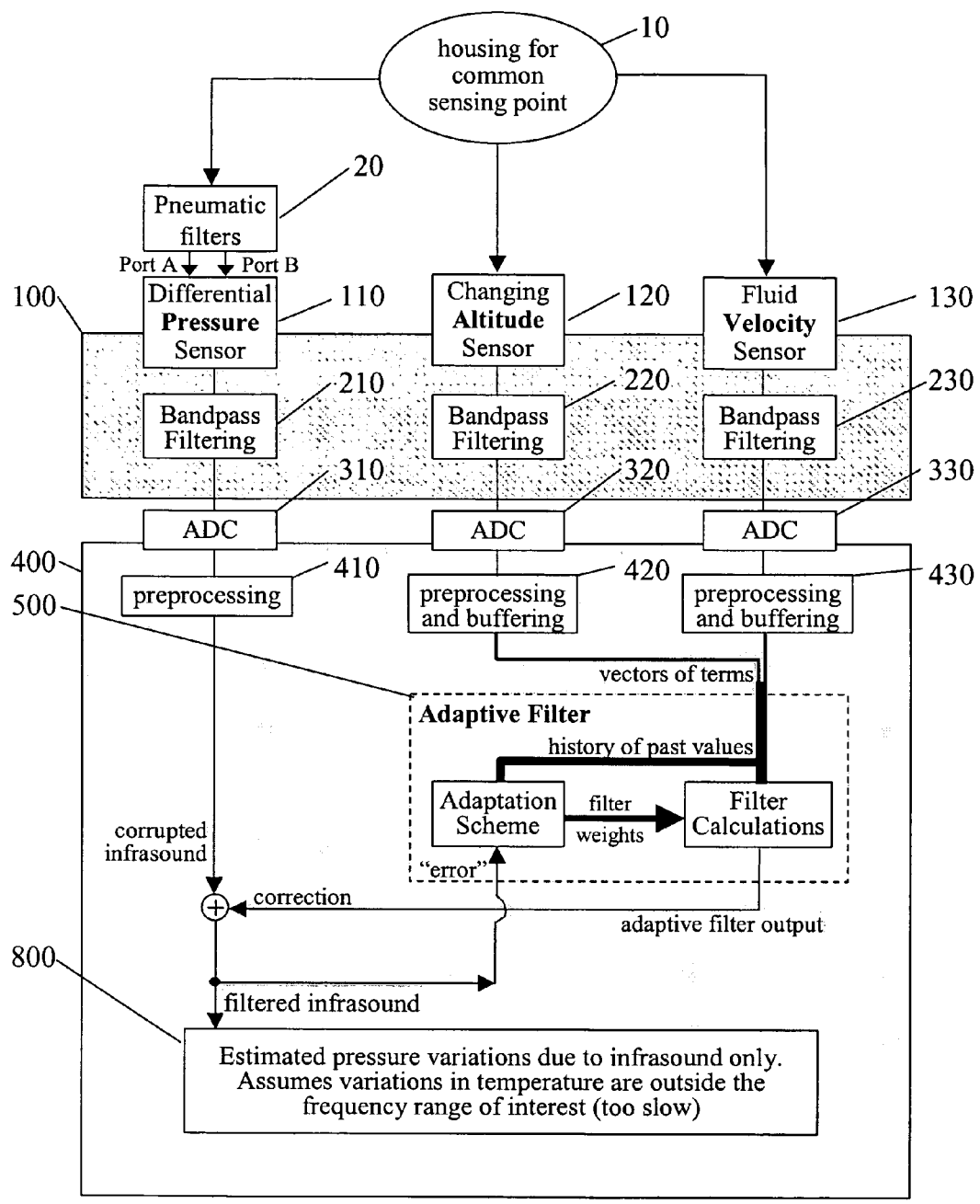
FIG. 4 is a schematic diagram showing the elements that make up the overall system architecture of the device according to the invention.
Figure 5:
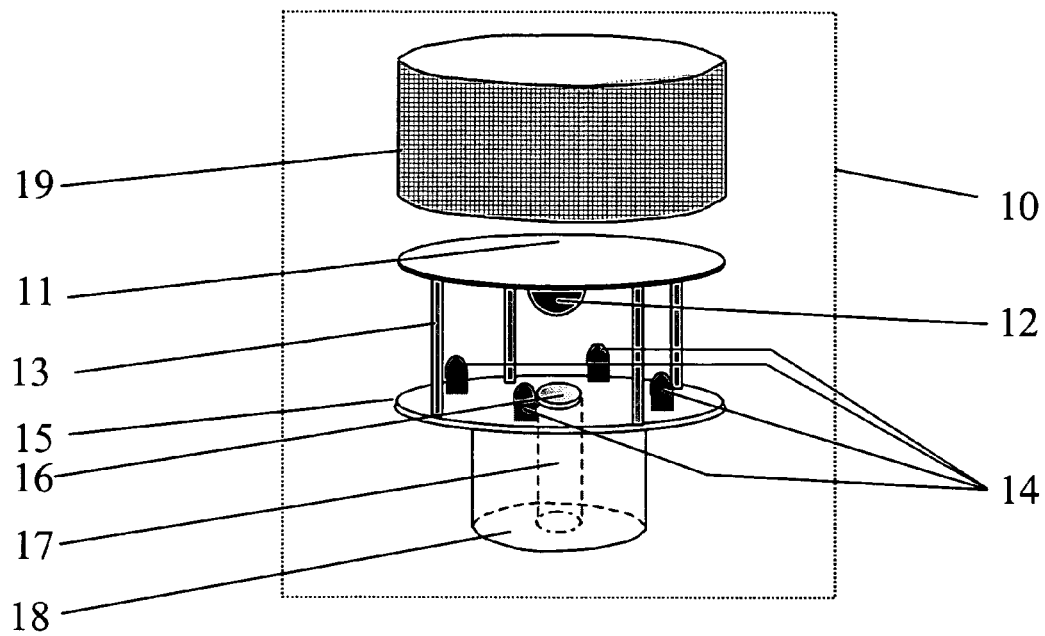
FIG. 5 is a schematic diagram showing the elements that make up the housing used for the co-located sensors.

A system block diagram of the invention is shown in FIG. 4. The invention includes a housing 10 that provides a common point of measurement for three sensors. A representation of this housing 10 is shown in FIG. 5. The top 11 of the housing is secured to the base 15 via several supports 13. The housing contains the common measurement points for the change in altitude sensor 12, the fluid speed sensor 14, and the pressure port 16 for the differential pressure measurement. The pressure port 16 is connected to a rigid wall pipe or tubing 17. Structure 18 is used to support the housing from below as shown or from above if the housing is inverted and suspended from 18. The sensors are protected from debris and wildlife by a suitable cover 19, which does not have a significant impact on the measurements. The cover 19, slides over the top to surround the circumference of the housing. The rigid wall pipe or tubing 17 feeds the pneumatic filters shown in FIG. 6 via the inlet port 21.

Figure 6:
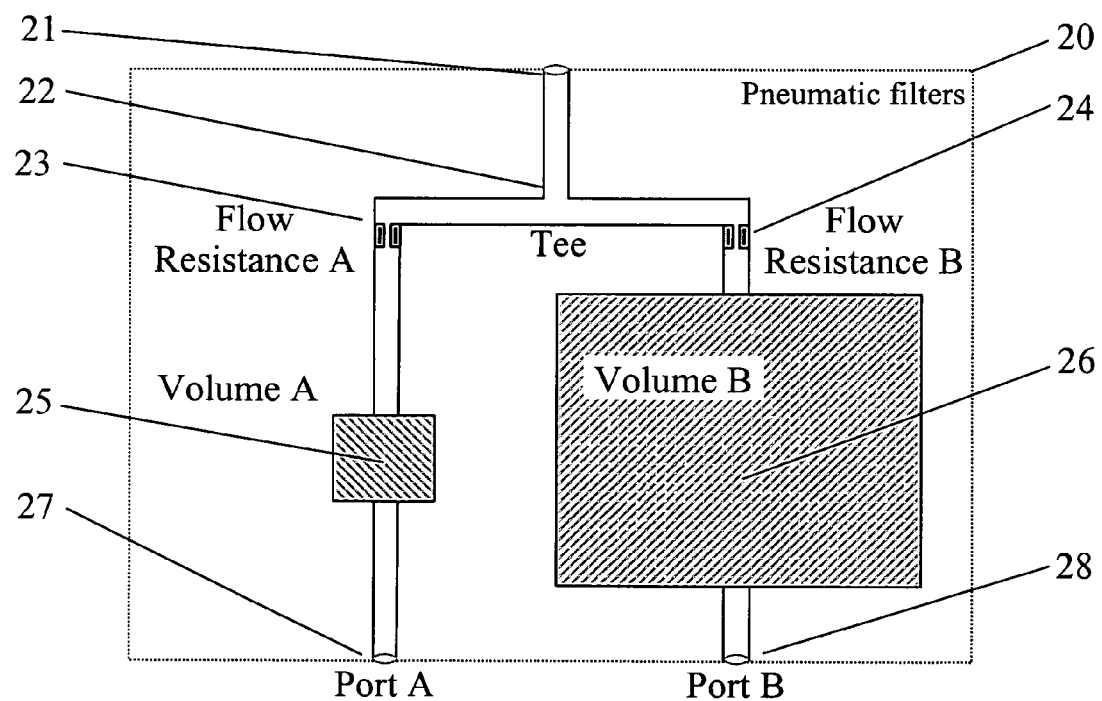
FIG. 6 is a schematic diagram showing the elements that make up the pneumatic bandpass filter.

In FIG. 6, the filter inlet port 21 leads to a "Tee" fitting 22. The "Tee" splits the pressure path into two filter halves, side A and side B. The filters are shown as simple "RC", first order, low pass filters with flow resistance and flow capacitance, but could be other types of pneumatic filters. Side A has a flow resistance 23 and flow capacitance volume 25. Side B has flow resistance 24 and flow capacitance volume 26. The two filters, A and B, have different time constants represented by showing volume B larger than volume A, but could also be obtain with different flow resistances 23 and 24. The different in time constants is such that the pressure at the two output ports, Port A 27 and Port B 28, have the same DC characteristics at 0 Hertz, but the two filters roll-off at different frequencies.

In FIG. 6., output ports, Port A 27 and Port B 28 are connected to the two ports (A and B) on the differential pressure sensor 110 in FIG. 4. The combined effect of the two different low pass filters with different time constants and the differential pressure sensor is a bandpass pneumatic filter of the pressure at inlet 16 FIG. 5, in the housing. The output from the differential pressure signal is typically an analog electrical signal. In this case the analog signal can be further filtered 210, if required, to prevent antialiasing prior to digital sampling. Also, the signal can be capacitively coupled to the analog to digital converter to remove any DC bias signal. After filtering, the differential pressure signal is digitally sampled by an analog to digital converter (ADC) 310 in FIG. 4. Note that the differential pressure sensor and the analog-to-digital converter must have sufficient dynamic range such that they do not reach operating limits under envisioned altitude and wind speed conditions. Saturation of these signals will prevent the adaptive filter from identifying the proper correlation. At the same time, the differential pressure sensor must have sufficient resolution to be able to measure the signals of interest. Typically this requires a 24-bit analog to digital converter and a differential pressure sensor with a resolution on the order of 0.01 Pascal and a range on the order of 1000 Pascal. The exact sensing requirements are dependent upon the construction of the housing 10, the rate of changes of fluid speed and altitude, and the infrasound source of interest.

FIG. 4 shows a sensor 120 for measuring the change of altitude. A variety of sensors are possible for this measurement. In FIG. 5 this change of altitude sensor 12 is envisioned as an accelerometer mounted in a vertical orientation. This accelerometer signal could be twice integrated in the analog domain within the bandpass filter 220 in FIG. 4. Alternatively, the acceleration signal is twice integrated digitally in the preprocessing section 420. This acceleration signal is first filtered 220 for antialiasing and to remove DC components and then sampled by the ADC 320. The net effect of either approach is that a bandpass, filtered, digital measurement of the change in altitude of the sensor housing is available after preprocessing 420. Note that this displacement measurement must have an accuracy that matches the accuracy of the pressure measurement. As a figure of merit, consider that at sea level a pressure change of 1.0 Pascal is roughly equivalent to an altitude change of 9 centimeters. So if you need to resolve 0.01 Pa, then you need vertical displacement accuracy on the order of 1 millimeter.

FIG. 4 contains a block representing a fluid velocity sensor 130. This sensor is shown as four nodes 14 in FIG. 5. that make up two ultrasonic transmitter/receiver pairs. The fluid speed sensor must have sufficient bandwidth and dynamic range. Other examples of fluid speed sensors with sufficient dynamic range are 3-node ultrasonic sensors, hot wire and hot film anemometers. An air mass flow sensor could also be used. Once the air speed signal is converted to an analog value, it is appropriately filtered 230 to remove DC contributions and for antialiasing prior to digitization by the analog to digital converter ADC 330. After preprocessing 430, the result is a measure of the contribution to the pressure in the housing at port 16 FIG. 5 due to the change in fluid speed. The details of the preprocessing 430 depend on the housing 10 and need to be determined experimentally. For example for a housing that blocks the movement of air, the speed squared might be used instead of speed to be representative of the dynamic pressure.

In FIG. 4, the shaded block 100 represents the region where the sensed physical values are converted to electrical signals. Blocks 310, 320, 330 show the conversion of analog signal to digital signals. The shaded block 400 represents a processing unit and contains the digital signals after the analog to digital conversion processes. Operations within the processing unit 400 are performed via computer software. The preprocessing in 410, 420, 430 may be just a matter of scaling. In the case of air speed 430, preprocessing involves the calibration of the relationship between air speed and the differential pressure sensor as mounted in the housing. Blocks 420 and 430 also contain data buffers to store the past history of the terms to be used in the adaptive filter. Digital filters require past terms to calculate the filter output. The buffers provide the past terms. Block 500 represents the adaptive filter algorithm running in software within the processing unit. The adaptive filter attempts to minimize the correlation between the "error" and the filtered speed and altitude terms from Blocks 420 and 430. The "error" term come from the filtered infrasound. An example of one type of adaptive scheme that can be used is the Kalman adaptive filter. In this case the filter calculations are just the calculation for a linear finite impulse response (FIR) filter, whose filter weights are updated by the adaptation scheme. One possible adaptation scheme is the least mean square error (LMS) algorithm where the algorithm attempts to minimize the mean square error. A wide variety of filters and adaptive algorithms are possible. The final output after processing is a filtered infrasound signal 800.

I claim:

1. A method for filtering unwanted components from an infrasound signal, the method comprising the steps of:
   (a) sampling an infrasound signal corrupted with undesired disturbances,
   (b) sampling a change in fluid speed signal that is correlated with the undesired disturbances,
   (c) preconditioning the change in fluid speed signal using a calibration of the sensor housing,
   (d) filtering the preconditioned values with an adaptive filter to generate a correction term,
   (e) adding the correction term to the sampled, corrupt infrasound signal,
   (f) outputting a corrected infrasound signal,
   (g) feeding back the corrected infrasound signal to be used in conjunction with the past history of preconditioned values to adjust the parameters used within the adaptive filter of step (c),
   whereby the disturbances effects caused by changes in the fluid speed are removed from the corrupted infrasound signal to provide a filtered measure of infrasound.

2. The method of claim 1, wherein said second sampling step comprises the step of sampling a change in elevation signal that is correlated with undesired disturbances.

3. The method of claim 2 wherein the preconditioning includes the change in elevation signal, whereby the disturbance effects caused by both the change in fluid speed and the change in elevation are removed from the corrupted infrasound signal to provide a filtered measure of infrasound.

4. A method for filtering undesirable components from an infrasound signal, the method comprising the steps of:
   measuring a change in an infrasound pressure with a first sensor to generate an uncorrected infrasound signal;
   measuring a change in at least one of displacement and fluid velocity with a second sensor; and
   generating a corrected infrasound signal based on the uncorrected infrasound signal and a correction term associated with the measured infrasound pressure change, the correction term generated with an adaptive filter and based at least in part on the measured change in at least one of displacement and fluid velocity.

5. The method of claim 4, further comprising the step of inputting the corrected infrasound signal into the adaptive filter.

6. The method of claim 5, wherein the correction term is based at least in part on the corrected infrasound signal.

7. The method of claim 4, wherein said second measuring step comprises measuring a change in displacement with the second sensor and measuring a change in fluid velocity with a third sensor.

8. The method of claim 7, wherein the correction term is based at least in part on the measured change in the displacement and the measured change in the fluid velocity.

9. The method of claim 7, wherein said step of measuring a change in displacement with the second sensor comprises integrating an output from an accelerometer.

10. A device for filtering undesirable components from an infrasound pressure measurement, comprising:
    a first sensor comprising an infrasound pressure measurement device;
    a second sensor comprising one of a fluid speed measurement device and a displacement measurement device;
    an adaptive filter connected to said second sensor; and
    a processing unit associated with said first sensor and said adaptive filter, said processing unit configured to generate a corrected infrasound signal based on a correction term determined by input from said adaptive filter and a signal from said first sensor.

11. The device of claim 10, further comprising a housing, said housing including said first sensor and said second sensor.

12. The device of claim 10, further comprising a third sensor comprising the other of said fluid speed measurement device and said displacement measurement device.

13. The device of claim 12, wherein said adaptive filter is connected to said second sensor and said third sensor.

14. The device of claim 12, further comprising a housing, said housing including said first sensor, said second sensor, and said third sensor.

15. The device of claim 10, wherein said fluid speed measurement device comprises one of an ultrasonic sensor, a hot wire anemometer, a hot film anemometer, total pressure probes, and mass flow sensors.

16. The device of claim 10, wherein said displacement measurement device comprises an accelerometer.

17. The device of claim 10, wherein said infrasound pressure measurement device comprises one of a differential pressure sensor, an absolute pressure sensor, and an optical fiber infrasound sensor.

18. The device of claim 10, wherein said processing unit comprises:
    a first input, said first input adapted to calculate an uncorrected infrasound pressure measurement from a signal from said first sensor; and
    a second input, said second input adapted to receive said correction term from a signal from said adaptive filter; and
    an integrator for combining said first input and said second input and producing said corrected infrasound signal.

19. The device of claim 10, wherein said adaptive filter comprises means for generating said correction term.

20. The device of claim 19, wherein said means comprises a set of instructions for enabling said adaptive filter to generate said correction term.

* * * * *